US00RE37348B1

(19) United States
(12) Reissued Patent
Kaku et al.

(10) Patent Number: US RE37,348 E
(45) Date of Reissued Patent: Sep. 4, 2001

(54) VERTICAL ENGINE

(75) Inventors: Junichi Kaku; Masaichi Yamada, both of Iwata (JP)

(73) Assignee: Yamaha Hatsudoki Kabushiki Kaisha, Iwata (JP)

(21) Appl. No.: 09/195,459

(22) Filed: Nov. 17, 1998

Related U.S. Patent Documents

Reissue of:
(64) Patent No.: 5,701,872
Issued: Dec. 30, 1997
Appl. No.: 08/556,065
Filed: Nov. 9, 1995

(30) Foreign Application Priority Data

Nov. 9, 1993 (JP) ..... 6-300350

(51) Int. Cl.[7] ..... F02M 37/06
(52) U.S. Cl. ..... 123/495; 123/195 HC; 123/509; 123/508; 123/196 W
(58) Field of Search ..... 123/73 AD, 196 W, 123/495, 447, 451, 507, 509, 508, 195 HC

(56) References Cited

U.S. PATENT DOCUMENTS 4,412,513 * 11/1983 Obermayer et al. ..... 123/508
4,480,623 * 11/1984 Thomas ..... 417/228
4,557,235 * 12/1985 Amemori et al. ..... 123/195 HC
4,976,591 * 12/1990 Rivas et al. ..... 417/228
5,052,897 * 10/1991 Yamashita et al. ..... 417/228
5,081,970 * 1/1992 Matsuoka ..... 123/508
5,603,303 * 2/1997 Okajima et al. ..... 123/508
5,806,499 * 9/1998 Stover et al. ..... 123/508
5,865,655 * 2/1999 Hiraoka et al. ..... 123/195 HC
5,878,710 * 3/1999 Ritter et al. ..... 123/508
5,957,673 * 9/1999 Kampichler et al. ..... 123/508
5,975,060 * 11/1999 Stover et al. ..... 123/508
5,992,392 * 11/1999 Saito ..... 123/508

FOREIGN PATENT DOCUMENTS 2 140 083 * 11/1984 (GB) ..... 123/508

* cited by examiner

*Primary Examiner*—Erick Solis
(74) *Attorney, Agent, or Firm*—Knobbe, Martens, Olson & Bear LLP

(57) ABSTRACT

A number of embodiments of high pressure pumps for internal combustion engines having vertically extending output shafts. In each embodiment, the high pressure pump has its pump driving shaft rotatable about an axis that is parallel to the crankshaft axis and is driven by the crankshaft. This arrangement lends itself to application in outboard motors. The high pressure pump includes an integral lubricating pump for lubricating components of the high pressure pump.

40 Claims, 10 Drawing Sheets

VERTICAL ENGINE

Matter enclosed in heavy brackets [ ] appears in the original patent but forms no part of this reissue specification; matter printed in italics indicates the additions made by reissue.

BACKGROUND OF THE INVENTION

This invention relates to a vertical engine of the type employed in outboard motors and more particularly to an improved fuel injection system for such vertical engines.

The use of fuel injection for internal combustion engines in order to improve performance, particularly fuel economy and exhaust emission control, is well known. A wide variety of types of fuel injection systems have been proposed for this purpose. Many of these systems inject the fuel into the induction system rather than into the combustion chamber. Such so-called "manifold injected" engines have advantages over carbureted engines. However, there are a number of additional advantages that can be obtained by utilizing direct cylinder injection.

By using direct cylinder injection, it is possible to more accurately control the actual fuel-air ratio in the combustion chamber on each cycle of operation. In addition, by utilizing direct cylinder injection, it is possible to obtain stratification in the combustion chamber and thus operate under a lean mixture under some or most running conditions. That is, by stratifying the charge in the combustion chamber, it is not necessary to have a homogeneous stoichiometric charge in the entire combustion chamber. All that is required is to have a stoichiometric charge present in the vicinity of the spark plug at the time that it is fired in order for combustion to be initiated.

There are, however, a number of reasons why direct cylinder injection is not utilized more widely. Not the least of these is cost. Not only are the injectors more costly and more critical with direct injected engines, but the supply system for supplying fuel to the injectors also becomes more complicated and expensive.

When direct cylinder injection is employed, the injection pressures must not only be higher, but they also must be more accurately controlled. As a result of this, it has been the practice to normally employ reciprocating plunger-type pumps for direct injected engines. Such pumps have a number of components, are complex, and in fact, can become quite bulky.

Although these problems may be overcome in some applications, there is a desire to employ direct cylinder or high pressure fuel injection systems for outboard motors. Like other vehicle applications, outboard matters are subject to concern over environmental control and also fuel economy. In addition, outboard motors frequently utilize two-cycle engines as their power plants. These engines can benefit as much or more from direct cylinder fuel injection as four-cycle engines.

In addition to the cost factor, the complexity of high pressure injection systems makes it more difficult to integrate them into outboard motors. One reason for this is that the outboard motor is a very compact type of device, and it may be difficult to locate the necessary components for a high pressure fuel injection system. In addition, the injection pump normally is driven off of the engine crankshaft and frequently in timed relationship thereto. This further complicates the placement and driving of such high pressure fuel injection pumps in outboard motors.

In addition to these problems, an outboard motor has another problem which is somewhat unique and different from automotive or other vehicle applications. That is, it is normally the practice to mount an outboard motor engine so that its crankshaft rotates about a vertically extending axis. As a result, the orientation of the engine is quite different than automotive and other applications. This further complicates the location and driving of accessories, such as high pressure fuel injection pumps.

When utilizing plunger or piston type high pressure fuel injection pumps, there are a number of mechanical components which are subject to wear. The fuel may not contact all of these components and in many instances, even if the fuel did, it does not have sufficient lubrication properties in order to prevent wear on the components.

For these reasons, it has also been the practice at times to incorporate a separate lubricating system for certain components of the high pressure pump. However, when the engine is mounted so that it its output shaft extends vertically, this further complicates the lubrication system for the fuel injection system and its high pressure pump.

It is, therefore, a principal object of this invention to provide an improved high pressure fuel injection pump for an internal combustion engine.

It is a further object of this invention to provide an improved high pressure fuel injection pump for a vertically disposed engine.

It is yet another object of this invention to provide an improved, compact and high efficiency fuel injection system for an outboard motor.

It is still another object of this invention to provide an improved high pressure fuel injection pump that can be operated with its driving shaft extending in a vertical direction.

It is a still further object of this invention to provide an improved lubricating system for such a vertically disposed high pressure pump.

SUMMARY OF THE INVENTION

This invention is adapted to be embodied in a fuel injected internal combustion engine having an output shaft rotatable about a vertically extending output shaft axis and driven by the combustion occurring in a combustion chamber. A high pressure piston pump is driven by a rotating pump drive shaft that is journaled for rotation about a vertically extending pump drive shaft axis that extends parallel to the engine output shaft axis. Pump driving means are provided for driving the pump drive shaft from the output shaft. A lubricant pump is driven off one end of the pump drive shaft for pumping lubricant to elements of the high pressure pump.

DETAILED DESCRIPTION OF THE PREFERRED EMBODIMENTS OF THE INVENTION

Figure 1:
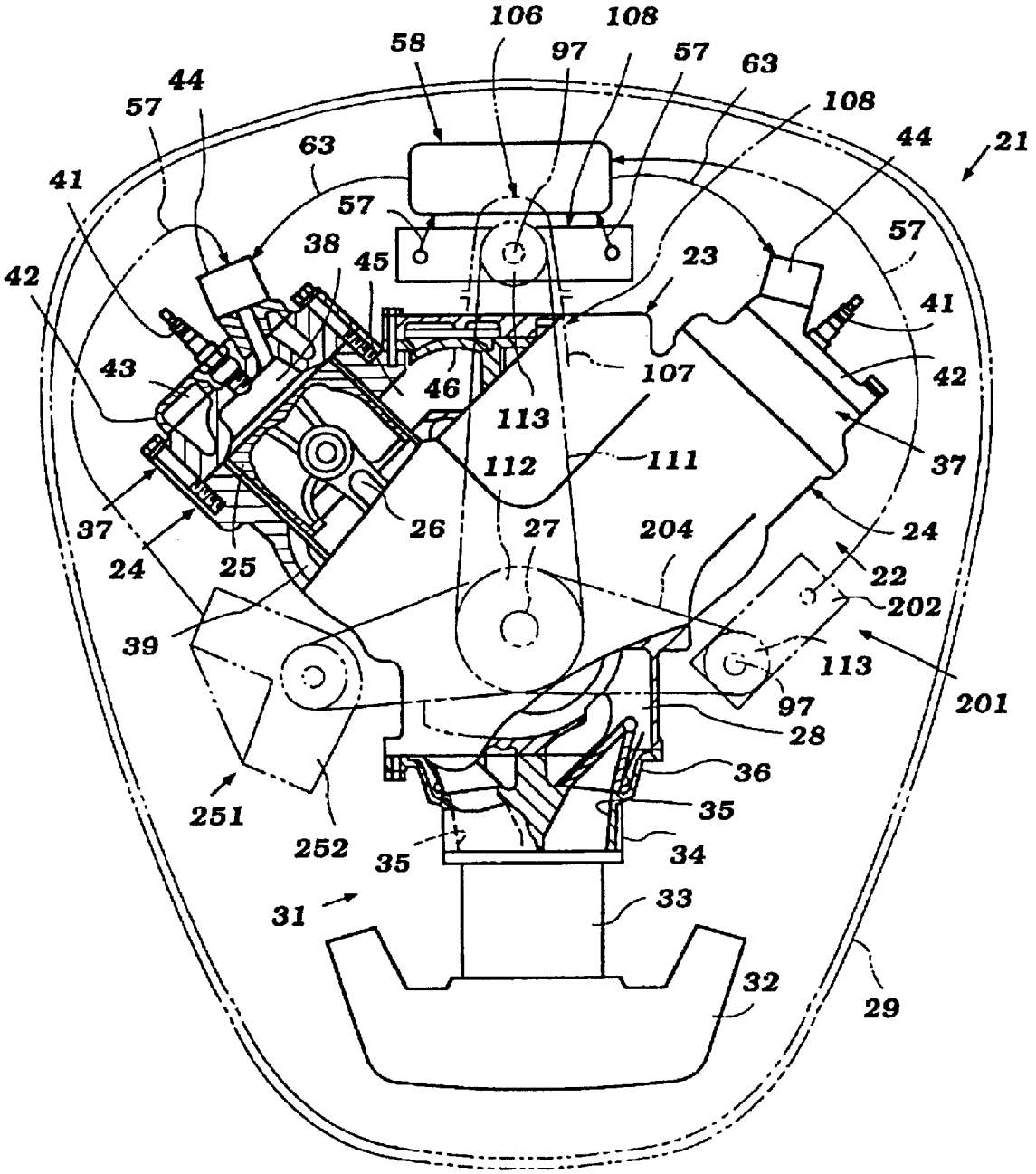
FIG. 1 is a top plan view of an outboard motor constructed in accordance with an embodiment of the invention, with the protective cowling shown in phantom and also illustrating alternate positions for the high pressure fuel injection pumps in phantom.

Referring now in detail to the drawings and initially to FIG. 1, an outboard motor constructed in accordance with an embodiment of the invention is shown partially, with certain components being shown in phantom as well as alternative constructions being shown in phantom, and with portions broken away so as to more clearly show the construction of the basic engine. The invention is described in conjunction with an outboard motor because the invention has particular utility in conjunction with applications where a very compact construction is required, as is the case with outboard motors. In addition, the engine is depicted in conjunction with an outboard motor because outboard motors normally have their crankshafts rotatable about vertically extending axes, and the invention has particular utility in conjunction with engines having such orientations. Finally the invention also has particular utility, but is not so limited, for use with two-cycle crankcase compression internal combustion engines, and such engines are frequently employed as the power units in internal combustion engines.

Because of the fact that the invention deals primarily with the fuel injection system, and specifically the high pressure fuel injection pump therefore, components of the outboard motor which are not necessary to understand the invention are not illustrated. It will be readily apparent to those skilled in the art how the invention can be practiced in conjunction with any known type of outboard motor, if that is the specific application for the invention. Also, the details of the powering internal combustion engine, which engine is indicated generally by the reference numeral 22, will be described only briefly in order to permit those skilled in the art to understand the orientation of the invention and how it can be utilized with engines of varying types.

In the illustrated embodiment, the engine 22 is depicted as being a V-6, two-cycle, crankcase compression engine, but for the reasons already mentioned, it will be apparent to those skilled in the art how the invention can be utilized with a wide variety of types of engines and engine configurations. In addition, although the invention is described in conjunction with a reciprocating engine, it should also be apparent to those skilled in to an that the invention can be utilized with a wide variety of OEM types at engines, such as rotary engines.

The engine 22 is comprised of a cylinder block 23 which is provided with a pair of angularity disposed cylinder banks 24. Each cylinder bank 24 is formed with three in-line, horizontally extending cylinder bores in which pistons 25 reciprocate. As is typical with V-type engine practice, the cylinder banks 24 may be staggered axially relative to each other so that connecting rods, indicated by the reference numeral 26, can connect the pistons 25 to common throws of a crankshaft 27.

The crankshaft 27 is rotatably journaled within a crankcase chamber 28 that is formed in part by the cylinder block 23 and by a crankcase member that is affixed thereto in any known manner. As is well known in two-cycle crankcase compression engine practice, the crankcase chamber 28 is divided into individual sealed portions, each associated with a respective one of the cylinder bores in which the pistons 25 reciprocate.

The engine 22 is confined within a surrounding protective cowling that is shown in phantom and identified by the reference numeral 29. Thus, the engine 22 and protective cowling 29 form the powerhead of be outboard motor the vertical disposition of the crankshaft 27 permits its attachment to a drive shaft (not shown) that depends from this powerhead through a drive shaft housing into a lower unit for driving a propulsion unit for propelling an associated watercraft, as is well known in this art.

The protective cowling 29 is formed with a suitable atmospheric air inlet device which preferably is designed so as to permit air to be drawn in for the operation of the engine 22 while, at the same time, excluding water from entering within the protective cowling 29. This air is then delivered to an induction system, which is indicated generally by the reference numeral 31, through an air inlet device 32 of that induction system.

The air inlet device 32 may include internal baffling for accomplishing silencing of the inducted air. Air is delivered from the air inlet device 32 through intake pipes 33 to an intake manifold 34. The intake manifold 34 has individual passages 35 that serve the individual crankcase chambers 29. A throttle valve assembly (not shown) may be mounted in this intake manifold 34 or in the intake pipes 33 for controlling the speed of the engine.

Reed-type check valves 36 are disposed in each of the manifold runners 35 so as to permit a charge to be drawn into the crankcase chamber portions 28 when the pistons 25 are moving upwardly. When the pistons move downwardly, these reed-type check valves 36 will close and permit the inducted charge to be compressed in the crankcase chambers 28.

Combustion chambers are formed by the heads of the pistons 25, the cylinder bores in which they reciprocate, and by cylinder head assemblies 31 which an affixed to the cylinder banks 24 in any known manner, such as by the illustrated but unnumbered fasteners. Each cylinder head assembly 37 has a plurality of recesses 38 which complete the formation of these combustion chambers. The combustion chamber recesses 38 may, at times, be referred to as the combustion chambers since, at top dead center, they comprise the substantial clearance volume of the engine, as best seen in the left-hand side of FIG. 1, wherein the piston 25 is shown at this top dead center position.

The charge which has been drawn into the combustion chambers 28 through the induction system 31 and compressed therein is transferred to these combustion chambers 38 through one or mum scavenge passages 39 formed in the cylinder block 23. This charge is then further compressed in to combustion chambers 38 and eventually fired by a spark plug 41. Obviously, there is and least one spark plug mounted is each cylinder head 37 for each cylinder. The spark plugs 41 are fired by a suitable ignition system in appropriate timed relationship.

As has been noted, the cylinder heads 37 are assemblies, and these include cover pieces 42 which assist in the formation of water cooling jackets 43 for water cooling of the engine. Such cooling jackets are also formed in other components of the engine 22 as is well known in this art. Water is drawn from the body of water in which the outboard motor operates for circulation through these water jackets in any manner known in this art.

Suitable high pressure fuel injectors, shown schematically and indicated by the reference numeral 41 are also mounted in the cover plates 42 and cylinder head assemblies 37. These fuel injectors 44 are supplied with high pressure fuel from a fuel supply system which will be described later, and which forms the primary portion of the invention Thus, when the fuel-air mixture is present in the combustion chambers 38 and fired by the spark plugs 41, the charge will burn and expand and drive the pistons 25 downwardly to drive the crankshaft 27.

The charge is then expelled through exhaust ports formed in the cylinder block 23 and which communicate with an exhaust manifold 45 formed in the valley between the cylinder banks 24. This exhaust manifold 45 is also formed by a cover plate assembly 46 which has a further water jacket for cooling of the exhaust manifold 45. As is typical with outboard motor practice, the exhaust manifold 45 has one or more collector sections, depending upon whether me cylinder banks 24 share a manifold or have separate manifolds.

This collector section extends downwardly and discharges the exhaust gases through an exhaust system, which is typically formed in major part in the drive shaft housing of the outboard motor, as is well known in this art. For the reasons already described, it is not believed that a further description of this known portion of the construction is required to permit those skilled in the art to practice the invention.

The construction of the engine 22 as thus far described may be considered to be conventional, as it has already been noted. For that reason, any further description of the basic structure of the engine 22 or the outboard motor 21, for that part, is believed to be unnecessary to enable those skilled in the art to practice the invention.

The fuel injection system will now be described in detail, initially primarily to the schematic view of FIG. 2. It has been noted that the fuel injectors 44 are of any known high pressure type. Since the invention deals primarily with the high pressure fuel injection pump, indicated generally by the reference numeral 47, the details of the fuel injectors 44 and other components of the injection system will be general in nature, and most of these components are illustrated merely schematically. Again, it will be readily apparent to those skilled in the art how the invention can be practiced in conjunction with any type of conventional components.

There is provided a remotely positioned fuel storage tank 48 which, in typical outboard motor practice, is positioned remotely within the hull of the associated watercraft. Obviously, however, the fuel tank 48 may be contained within the powerhead of the outboard motor 21, or a small supply tank may be thus located that is served by a remote main tank.

An electrically driven low pressure fuel pump 49 is submerged in the fuel tank 48 below the fuel level therein and discharges fuel through an outlet fitting 51. This fuel flows in the direction shown by the arrow 52 through a fuel filter 53, which may be located in the powerhead somewhere within the protective cowling 29 to facilitate servicing. This fuel is then supplied through a conduit 54 to the delivery inlet 55 of die high pressure pump 47. A low pressure regulator 56 regulates the pressure at which fuel is supplied to the high pressure pump 47.

Before describing the details of the high pressure pump 47, the remaining components of the system will be described.

The high pressure pump 47 supplies fuel under a high pressure in pulsed intervals through a pressure conduit 57 to an accumulator 58. The accumulator 58 has an inlet fitting 59 to which the fuel is delivered. The pressure in the accumulator 58 may be controlled by an electronic control 61 under the direction of a CPU, indicated generally by the reference numeral 62. This control 61 may also include a distributor arrangement for delivering fuel through respective conduits 63 to the fuel injectors 44.

Figure 2:
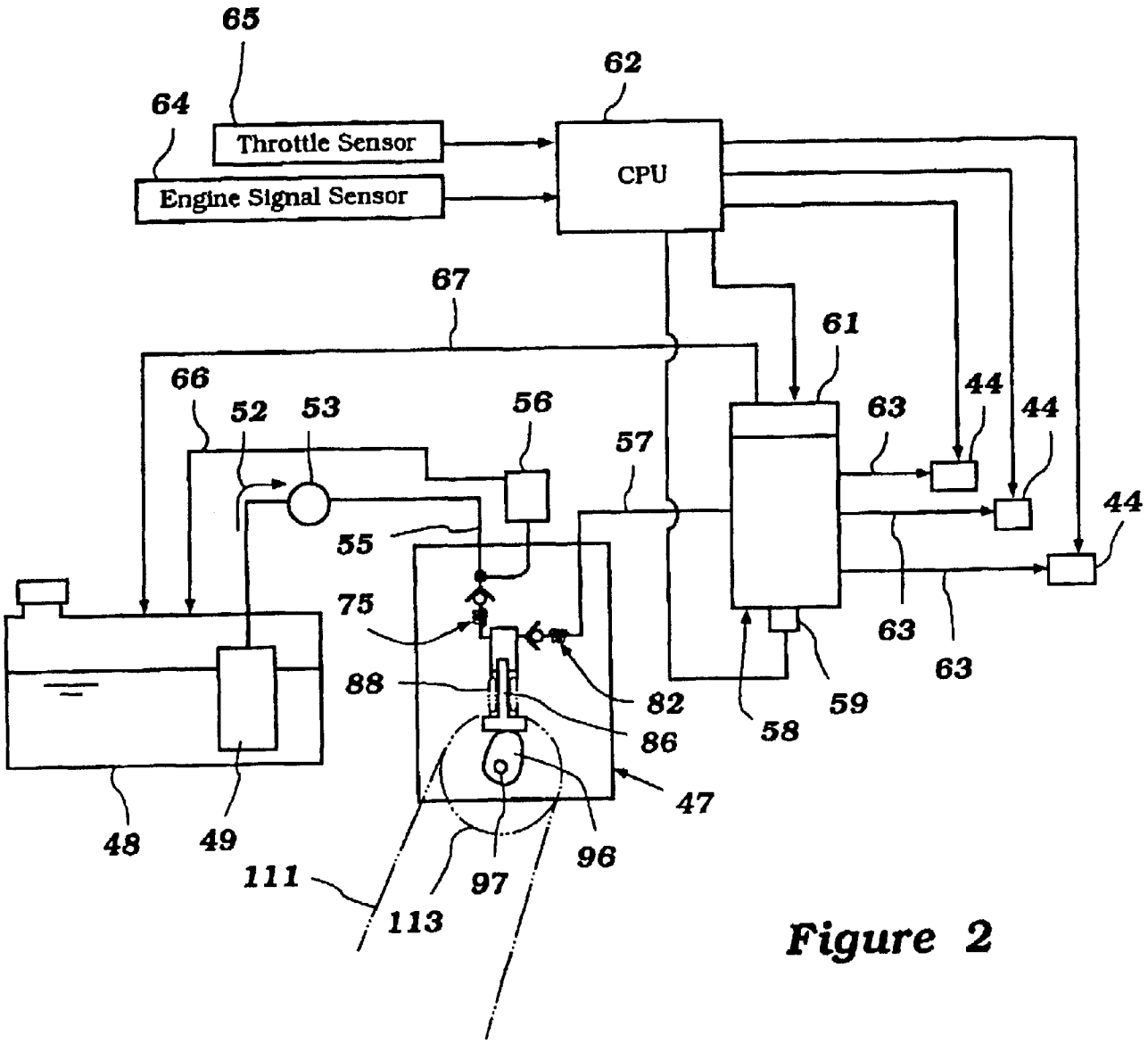
FIG. 2 is a schematic view showing the components associated with the fuel injection system, including the high pressure fuel injection pump.

It should be noted tat FIG. 2 shows three fuel injectors 44 which are the fuel injectors associated with one cylinder bank. It has been noted already that the engine 22 is a V-6 engine and hence, there is another bank of fuel injectors. As will become apparent later, the high pressure pump 47 may have banks of plungers or may be of an in-line type, and this will determine to some extent how the fuel is actually supplied from the pump 47 to the individual injectors 44. Again how this is done forms no major part of the invention.

Returning now to the description of the CPU 62, this CPU 62 may have any control strategy that operates on input signals from a wide variety of sensors. In the illustrated embodiment, two such sensors are illustrated. These sensors comprise an engine speed sensor 64 which supplies signals not only of engine speed but of crank angle, and an operator demand sensor or load sensor, such as a throttle sensor 65. Obviously, those skilled in the art will readily understand how the invention may be practiced with a wide variety of types of control strategies.

It has been noted that the low pressure fuel regulator 56 regulates the low pressure supplied to the high pressure pump 47, and the control 61 of the accumulator 58 regulates the pressure therein. These pressures are regulated by dumping excess fuel back to the fuel tank 48 through respective return conduits 66 and 67, as is well known in this art.

The construction of the high pressure pump 47 will now be described in detail by reference to FIGS. 3 and 4, where the actual construction of the pump is shown, although certain of the auxiliaries associated with it are shown in phantom. The pump 47 is comprised of a main housing assembly 68 which, in the illustrated embodiment, has a pair of opposed cylinder banks 69. In the illustrated arrangement, each bank 69 contains one pumping assembly. It will be readily apparent to those skilled in the art, however, that the number of pumping assemblies employed can be increased, and one way in which this may be done will be described later, when the actual pumping mechanisms are described.

The banks 69 are each provided with respective cylinder heads 71 that are affixed thereto in any known manner. The cylinder head of one bank is provided with a T-shaped fitting 72 that receives the end of the conduit 54 for supply thereto. The T-fitting 72 has a branch that supplies a further conduit 73 which extends, as indicated at a, to a corresponding inlet fitting 74 of the cylinder head 71 of the other cylinder bank.

Figure 4:
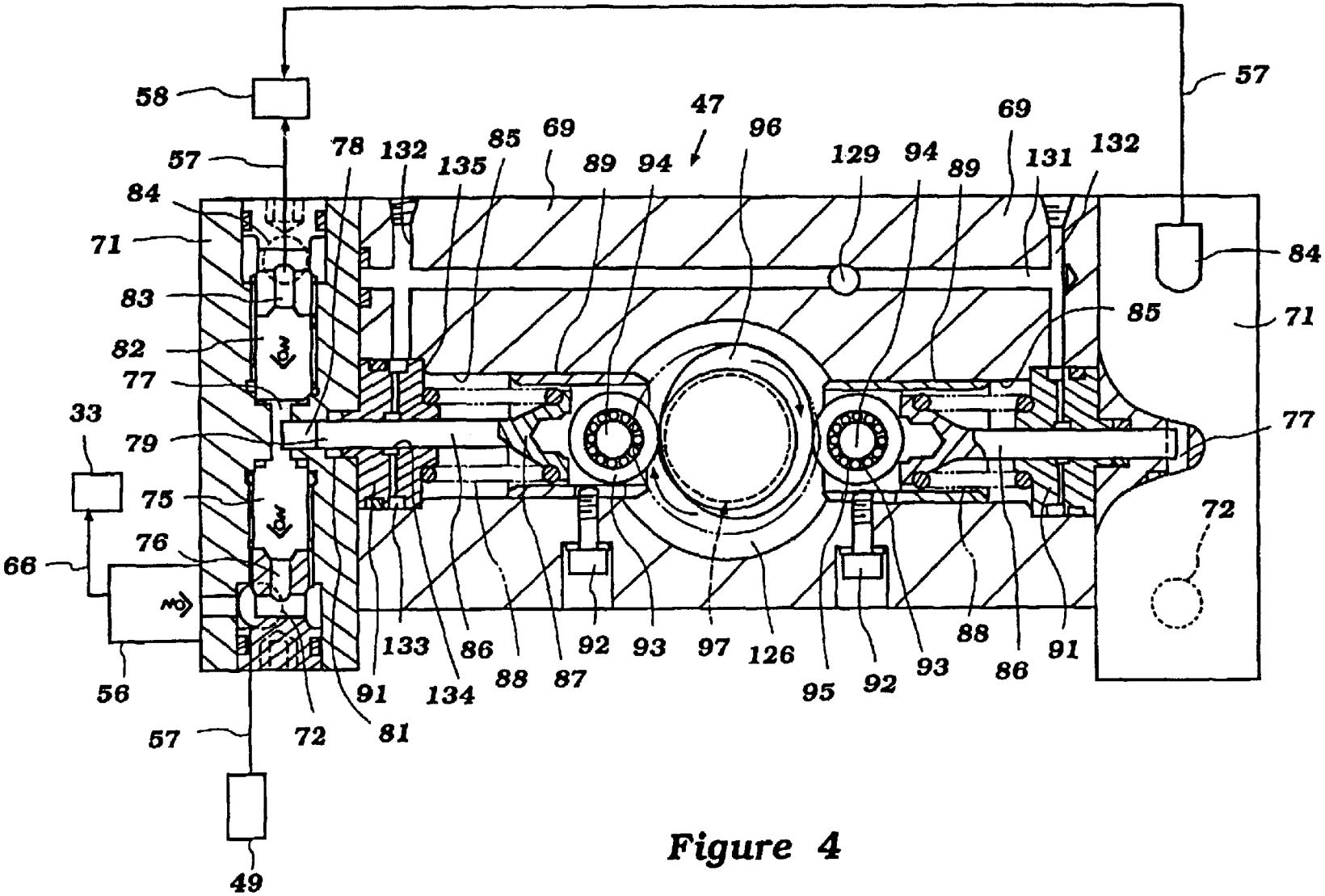
FIG. 4 is a cross-sectional view taken along the line 4—4 of FIG. 3.

The construction of these cylinder heads 71 appears in most detail in FIG. 4. It will be seen that each cylinder head 71 includes a delivery check valve 75 that cooperates with an inlet fitting 76 to permit the fuel to be drawn into a pumping chamber 77. This pumping chamber 77 communicates with a pumping bore 78 in which one end of a pumping plunger 79 is slidably supported. An O-ring seal 81 encircles the pumping plunger 79 and provides a fluid seal therearound.

The pumping plunger 79 is reciprocated, in a manner to be described, and when the volume of the pumping chamber 77 is increasing, fluid will be drawn into this pumping chamber through die opening of the delivery check valve 75. When the volume of the pumping chamber 77 is being decreased by the upward movement of the pumping plunger 79, high pressure will be generated and it will open a discharge check valve 82 to permit fluid to be discharged through a fitting 83 to the conduit 57 which communicates with the accumulator chamber 58. An outlet fitting 84 is provided for communication between the fitting 83 and the conduit 57.

Turning now to the operation for reciprocating the pumping plungers 74, it will be seen that the banks 69 of the housing assembly 68 are formed with bores 85 that are concentric with the pumping chamber portion 78. The pumping plungers 100 have a shank portion 86 that has a yoke part 87 at its bottom end that A urged by a coil compression spring 88 into engagement with a piston or tappet-type actuator 89. At the opposite end, the spring 88 acts against a closure plug 91 that closes the upper end of the bore 85 and which slidably supports the pumping plunger 79. An O ring seal 90 seals the plugs 91 to the housing 69.

The piston or tappet actuator 89 is held against rotation by means of a set screw 92 and carries a roller follower 93 which is journaled on a shaft 94 by a needle-bearing assembly 95. The spring 88 in addition to urging the pump plunger yoke 87 into engagement with the actuating tappet 89, also urges the tappet into engagement with a drive cam 96 of a pump drive shaft, indicated generally by the reference numeral 97.

Figure 3:
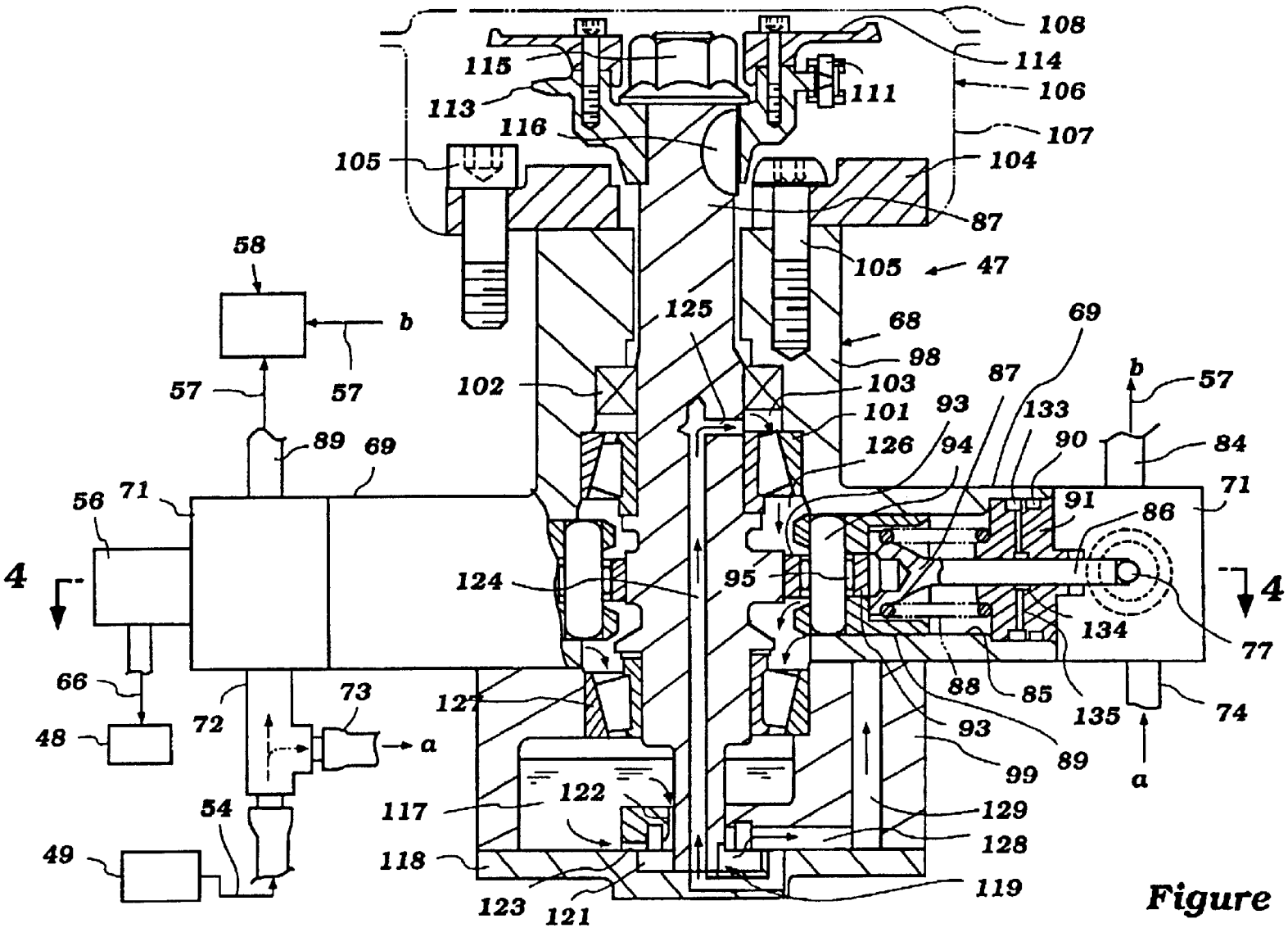
FIG. 3 is an enlarged view which is partially in cross-section through the high pressure pump in accordance with one embodiment of the invention and shows the system components, in part schematically, and thus is related closely to FIG. 2.

Referring now primarily to FIG. 3, it will be seen that the housing assembly 68 has an upwardly extending cylindrical portion 98 and a downwardly extending larger diameter cylindrical attachment piece 99. The upper portion 98 rotatably journals the pump drive shaft 97 through a first thrust bearing 101. Disposed above the thrust bearing 101 is an oil set 102 that defines a lubricant receiving chamber 103, for a purpose which will be described.

The pump drive shaft 97 continues upwardly into and through a cover plate 104 that is held in place by threaded fasteners 105. This cover plate 104 permits the pump drive shaft to enter into a drive cavity formed by a timing drive cover 106 that is comprised of a lower portion 107 and an upper portion 108, which may be of any known construction and which are shown primarily in phantom in the figures. Reference also should be had to FIG. 1 for this construction.

This contains a timing drive, indicated generally by the reference numeral 109, which consists of a chain 111 or other flexible transmitter such as a toothed belt that is driven by a drive sprocket 112 that is affixed to either the upper or lower end of the crankshaft 27. This drive chain 111 is in engagement also with a the sprocket 113 that is held to the upper end of the pump drive shaft 97 by means of a retainer plate assembly 114 and a nut 115 threaded onto the upper end of the pump drive shaft 97. Finally, a drive key 116 interconnects the sprocket 113 with the pump drive shaft 97 to provide a timed driving connection therebetween.

Referring now again primarily to FIG. 3, the lower end of housing attachment 90 as has been noted, is of a larger diameter than the upper portion 90 This is to permit it to form a combined oil reservoir and pump cavity 117, the lower end of which is closed by a closure plate 118. An oil pump assembly, indicated generally by the reference numeral 119, is driven off of the lower end of the pump drive shaft 97. This oil pump assembly 119 may be comprised of a gerotor-type pump that realms oil in a pumping cavity 121 from the reservoir 117 and pressurizes it. Oil is delivered through delivery ports 122 and 123.

The oil is pumped under high pressure through a first conduit 124 that extends axially through the pump drive shaft 97 from the pumping cavity 121, and specifically its outlet, to a cross-drilling 125 that communicates with the lubricant cavity 103 so as to lubricate the upper bearing 101. This lubricant then flows downwardly so as to lubricate the cams 96, roller followers 93, needle bearings 95 and pin 94. In addition, same of this lubricant will also lubricate the lower end of the pump driving pistons or tappets 89. An oil cavity 126 is formed around the pump driving elements for assisting in this lubrication.

The lower pump housing portion 99 supports a second thrust bearing 127 which receives the down-flowing lubricant from the cavity 126 and permits it to drain back into the reservoir cavity 117.

In addition to this lubricant path, the pump 119 further delivers lubricant under pressure through a passageway 128 formed between the pump housing member 99 and the cover plate 118, which communicates with a further main supply passageway 129. The main supply passageway 129 extends upwardly, as shown in FIG. 4, and intersects a drilled passageway 131 which is drilled through the pump housing 69, and is intersected by a pair of cross-drillings 132, each of which extends to the respective plunger supporting closure elements 91, These elements are provided with cross-drillings that extend from circumferential grooves 133 formed therein to inner circumferential grooves 134 that surround the pump plungers 79. These cross-drillings are indicated by the reference numeral 135 in the drawings. This oil will flow into the bores 85 and can drain back into the cavity 126 for return to the reservoir 117.

As should be readily apparent from the foregoing description, the configuration and orientation of the high pressure pump 47 permits it to be conveniently mounted in the valley between the cylinder heads 37 adjacent the pressure accumulator 58 so as to provide a very compact assembly and one which is located close to the actual fuel injectors 44 so as to minimize the length of the conduits. In addition, the vertical disposition of the pump drive shaft 97 permits it to drive its own lubricating pump off the lower end thereof, and lubricant can be returned to the reservoir of this pump through a gravity return system. Hence, the structure is not only compact, but it is also well lubricated and well protected.

Figure 5:
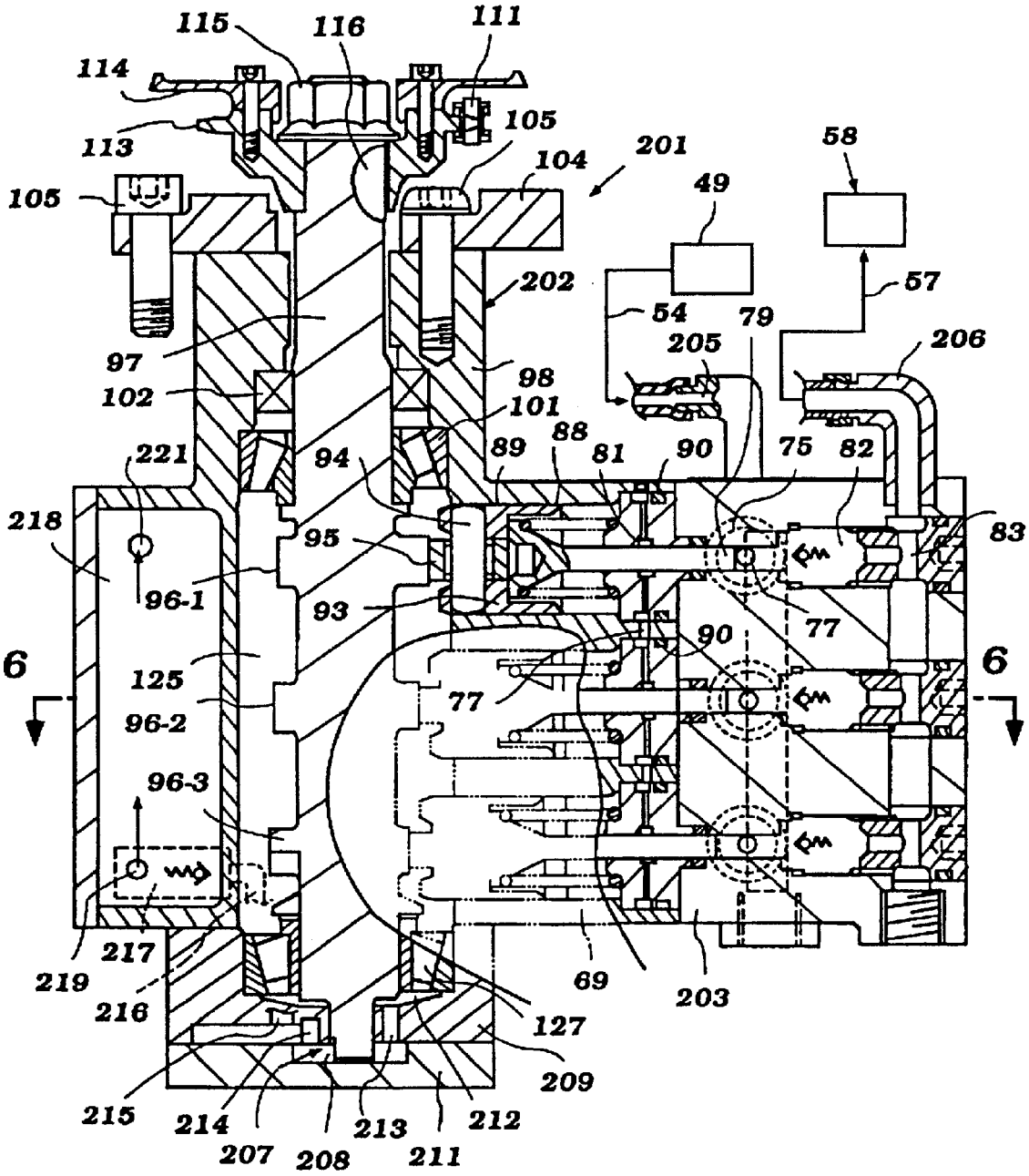
FIG. 5 is a cross-sectional view, in part similar to FIG. 3, and shows another of the pump embodiments, which is also shown in phantom lines in FIG. 1.
Figure 6:
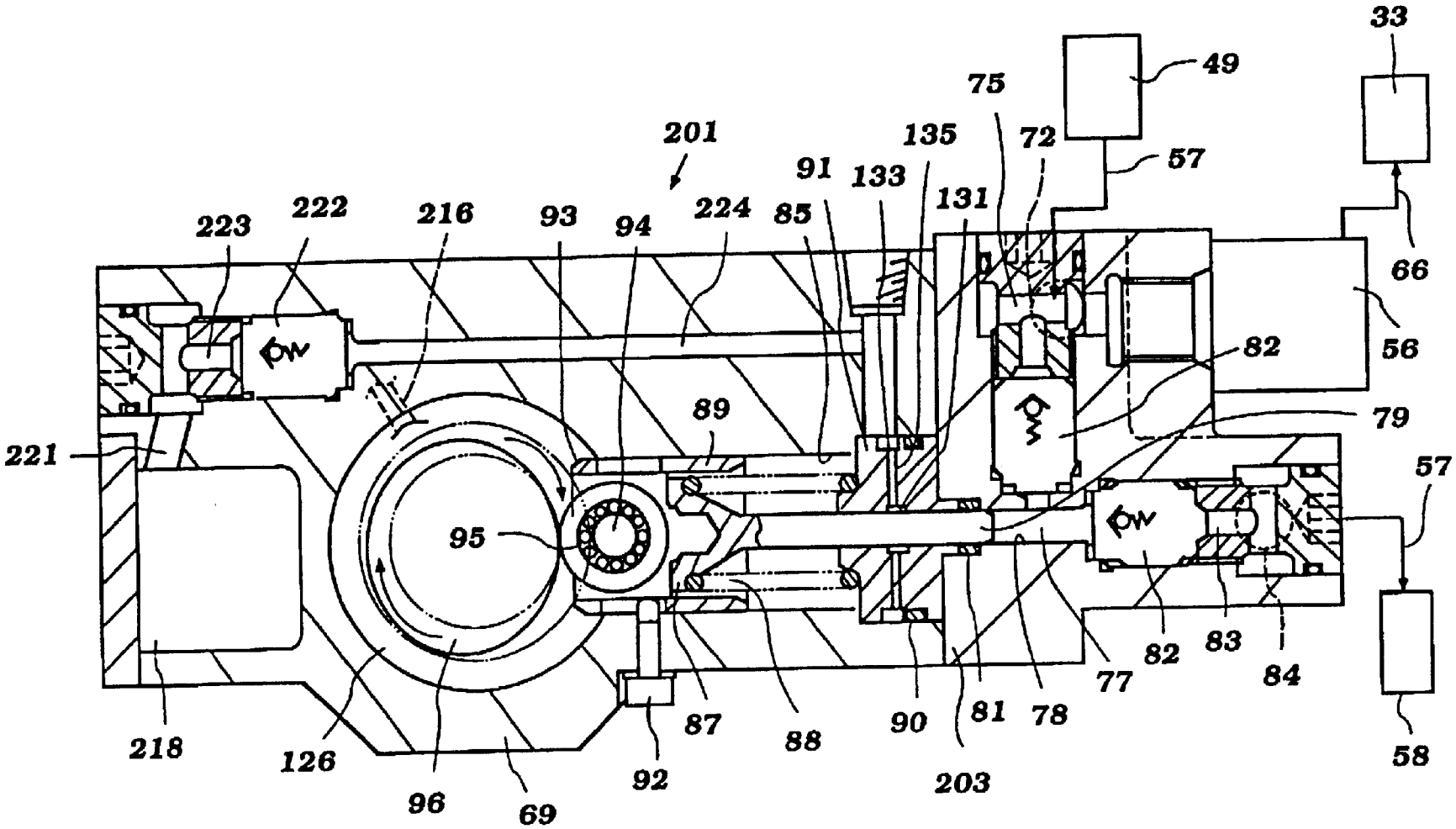
FIG. 6 is a cross-sectional view taken along the line 6—6 of FIG. 5.

A high pressure oil pump constructed in accordance with another embodiment of the invention is illustrated in FIGS. 5 and 6 and is indicated generally by the reference numeral 201. The pump 201 is employed in a system of the type as previously described and thus, many components associated with this pump are the same or substantially the same and have been identified by the same reference numeral when that is the case.

In the previously described embodiment, the high pressure pump 47 was of the opposed piston type, whereas the embodiment of FIGS. 5 and 6 shows an in-line type of pump. Therefore, the pump body 202 is formed with in-line bores that receive the plunger mechanisms and which are closed by a cylinder head assembly, indicated generally by the reference numeral 203. Each pumping unit is the same as that previously described and, for that reason, the components of the pumping elements which are the same in construction and operation as those already described have been identified by the same reference numerals and will be described again only insofar as is necessary to understand the construction and operation of this embodiment.

The drive for the pump shaft 97 is also the same as that previously described and, for that reason, this mechanism also will not be described again in detail. In this embodiment, since the outer housing 202 is formed with aligned cylinder bores that receive the pumping plunger actuating pistons or tappets 89, it is higher than the previously described embodiment. However, because of this disposition, it is shorter in width and thus can be located, for example, on one side of one of the cylinder banks 24. Such an alternative location is shown in FIG. 1 by the phantom line view.

In view of this location, a shorter drive chain 204 or a flexible timing belt may be employed, which is still driven by the crankshaft sprocket 112 and which drives the pump shaft 97 by a pump drive sprocket 113. This type of pump lends itself better to an arrangement wherein it is utilized with an in-line engine, but can be utilized with a V-type engine with either a slot pump on one side of the one cylinder bank 24 or with individual pumps on one side of each cylinder bank, as illustrated.

As may be seen, the pump drive shaft, therefore, has three pump actuating cams 96-1, 96-2 and 96-3. As has been previously noted, the V-type or opposed-type pump, like the pump 47, may also be employed with multiple plunger cylinders, and these would embody such an extended cam shaft having a greater number of pump plungers.

With this arrangement, however, there is a simpler disposition of the manifolding for supplying fuel to and from the pump 201 and accordingly, a single fluid inlet conduit 205 may be provided that supplies all of the delivery valves 75 for this embodiment. The communication between the delivery valves 15 can be formed internally in the cylinder head 203. In addition, a single pump discharge fitting 206 can be mounted in the cylinder head 203 and is served by internal conduits which communicate with each of the pump delivery check valves 82.

Because of the greater length of the pump shaft 97 in this embodiment, a different arrangement is provided for the lubricant and the reservoir therefore. In this embodiment, a gerotor-type pump, indicated generally by the reference numeral 207 and having a pumping cavity 208, is formed between a lower housing member 209 that is fixed to the main housing member 202 in a suitable fashion, and closed by a closure plate 211. A drain reservoir 212 below the lowermost pump drive shaft bearing 127 collects the oil and returns it to the pumping cavity 208 through a drain passageway 213. The lubricant is then delivered under pressure by the pumping element of the gerotor pump 207 to a high pressure discharge 214 which communicates with a delivery passage 215. The passage 215, in turn, communicates with a fitting 216 and through a pressure responsive check valve 217 with an oil reservoir 218. A port 219 in the housing piece 202 permits this communication.

A discharge passageway 221 extends from this reservoir cavity 218 to an oil delivery check valve 222 positioned in a pressure fitting 223. The pressure fitting 223 communicates with a drilled passageway 224 (FIG. 6) which, in turn, supplies oil to the oil delivery grooves 133 of each of the pump plunger supports 91 in this embodiment.

A separate passageway (not shown) may extend from the pump pressure cavity 214 to a point above the uppermost pump drive shaft support bearing 101 for its lubrication. Again, the oil will drain through the return path as aforedescribed.

Figure 7:
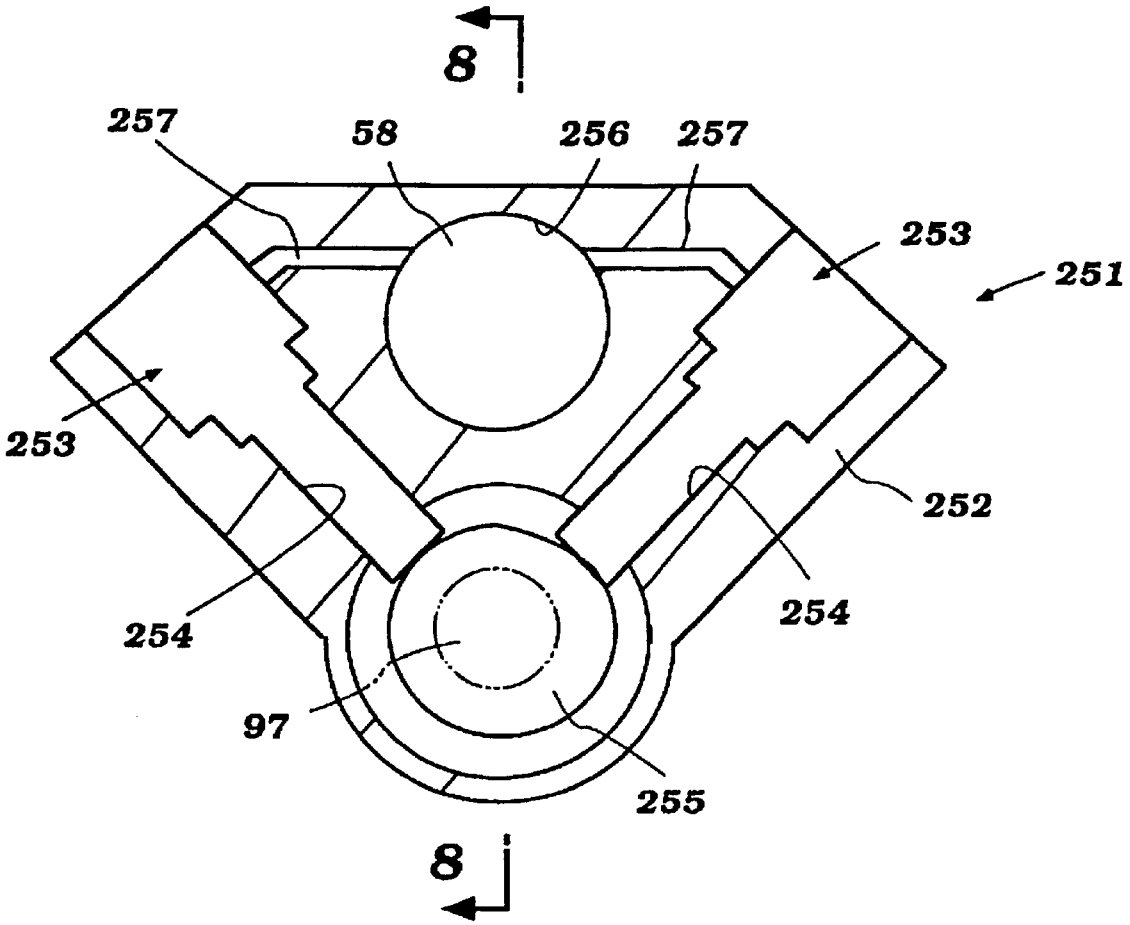
FIG. 7 is a partial cross-sectional Kew taken through the cylinder block of a high pressure fuel injection pump constructed in accordance with another embodiment of the invention, which embodiment is also shown in phantom in FIG. 1.
Figure 8:
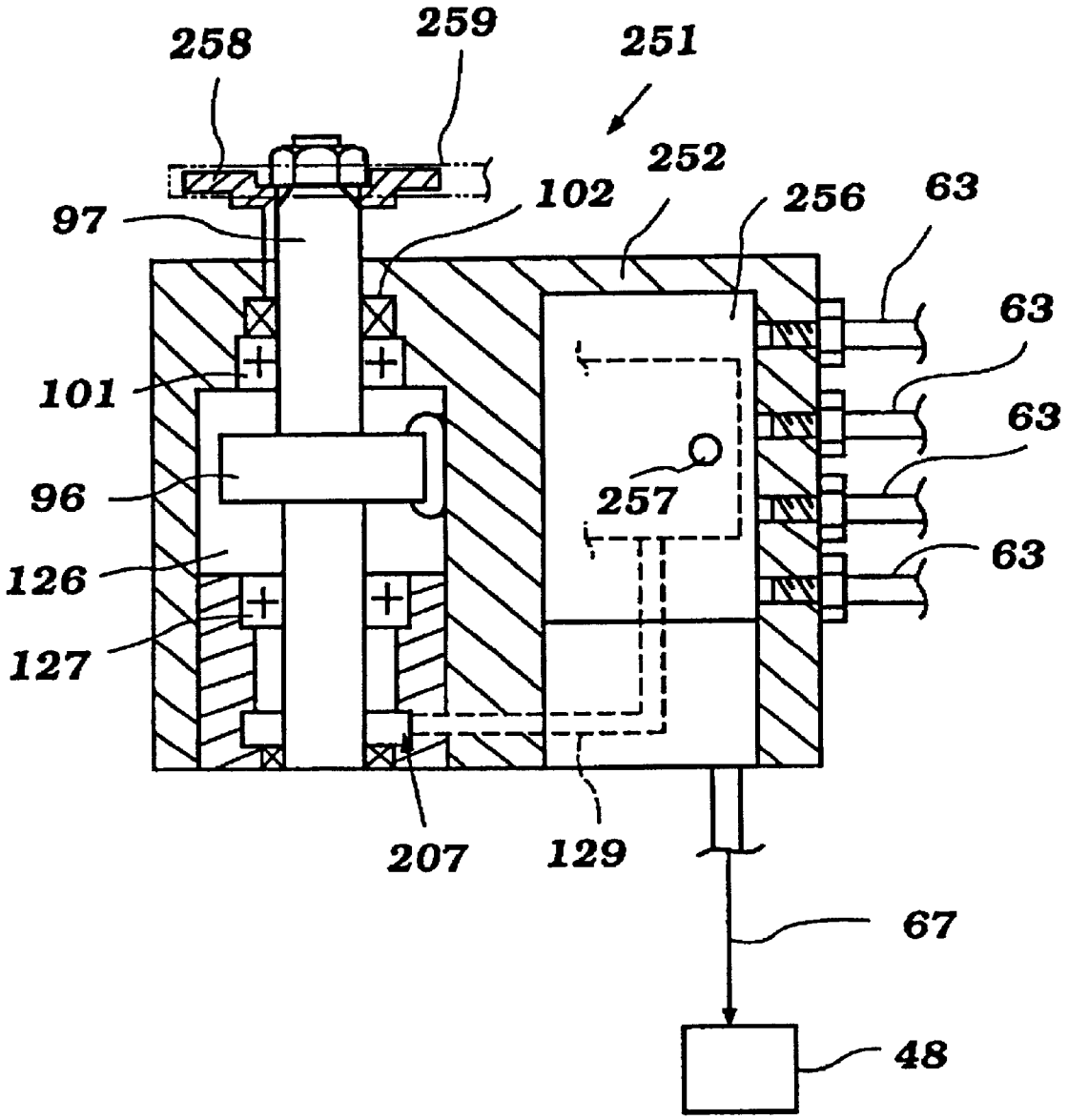
FIG. 8 is a cross-sectional view taken along the line 8—8 of FIG. 7, and shows certain other components of the system schematically.

The invention has been described thus far in conjunction with opposed-type and in-line-type of high pressure fuel pumps. Another embodiment appears in FIGS. 7 and 8 and provides a V-type high pressure fuel pump, indicated generally by the reference numeral 251. This type of fuel pump may be easily incorporated in conjunction with a V-type engine, and one possible location is shown in phantom in FIG. 1. In this location the pump can be disposed compactly to the engine 22 because of both units V shaped configuration as seen in FIG. 1.

Again, be pump 251 basically has the same pumping plunger arrangements as those previously described and, for that reason, where components of this embodiment are the same or substantially similar to those previously described, will be identified by the same reference numerals, or the parts are not shown, because it is believed that those skilled in the art will readily understand the arrangement of the components. In this embodiment the pump 251 is designed for a four cylinder engine, but obviously this pump may be used with engines having any number of cylinders.

In this embodiment the pump 251 includes a cylinder block 252 that has a pair of aligned banks, each of which is adapted to receive a pumping assembly, indicated generally by the reference numerals 253, which comprise the pumping plungers, delivery lines and actuators as previously described. One cylinder bank extends generally parallel to one of the engine cylinder banks 24. The other pump cylinder bank is perpendicular to the first one.

These elements are mounted primarily in bores 254 formed at the lower portion of the pump receiving cavities, wherein the piston actuators, which are not shown, can operate with cam lobes 255 formed integrally on the cam shaft, which is indicated by the same reference numeral as previously applied, i.e., 97.

In this embodiment, the accumulator chamber 58 may be formed by a bore 256 that is formed integrally in the cylinder block 252 in the area between the bores 253 that receive the pumping mechanism. Internal cavities 257 perform the function of the supply conduits 57 from the previously described embodiments which supply the high pressure fluid to the accumulator chamber 256. A pressure regulator may be contained within this assembly and hence, the high pressure regulated fuel return line 67 is connected directly to the fuel tank 48 for this return.

This embodiment employs a more compact lubricant pump, which can have the same construction as that of the embodiments of FIGS. 5 and 6, and which is, therefore, identified by the same reference numeral 207. In all other regards, this embodiment is the same as those previously described.

A driving sprocket 258 is affixed to the upper end of the pump drive shaft 97 and is driven by a chain 259 or a flexible timing belt off of the crankshaft driving sprocket 112, as shown in FIG. 1.

Figure 9:
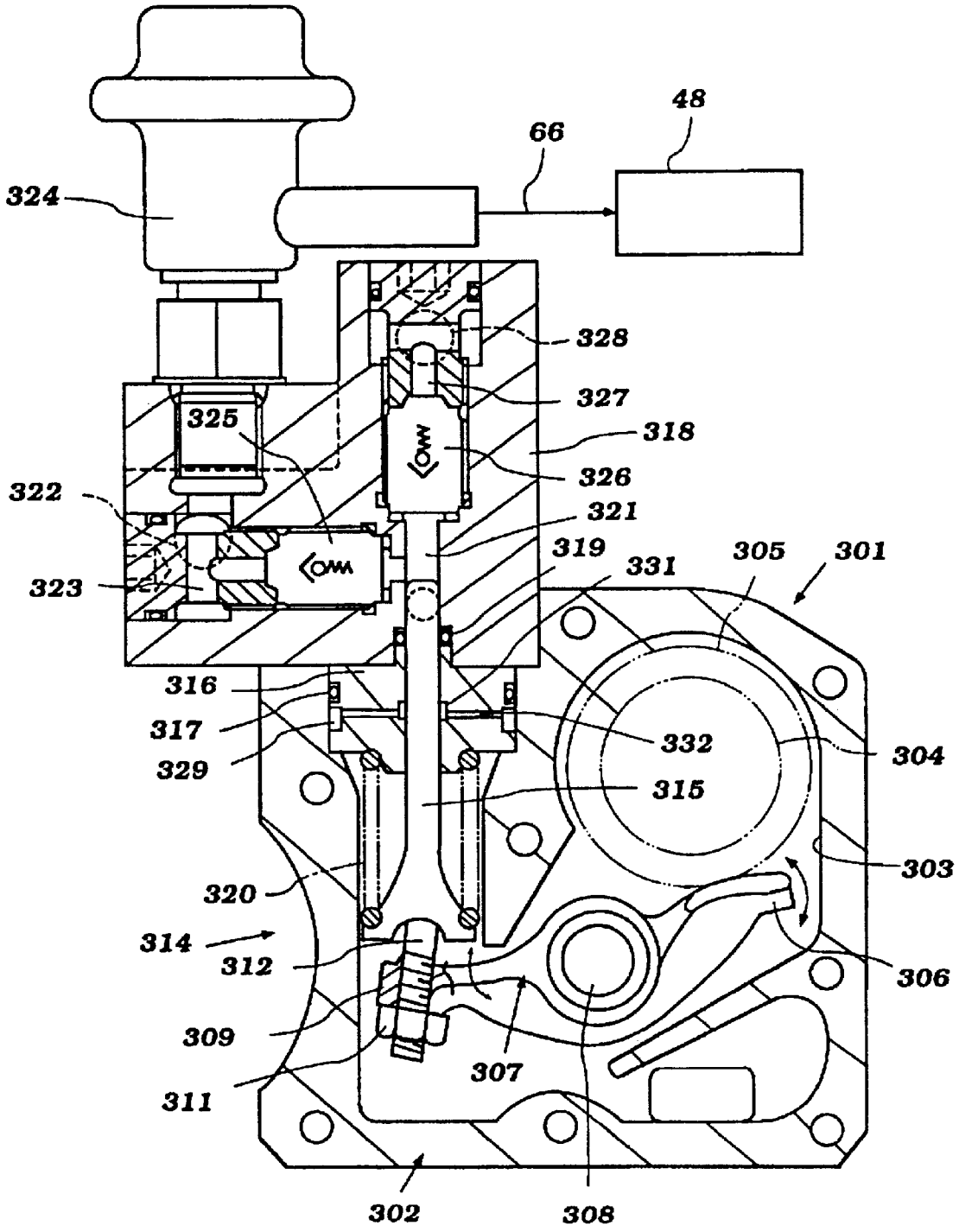
FIG. 9 is a cross-sectional view, in part similar to FIGS. 4 and 6, and shows another embodiment of the invention.

In the embodiments of the invention as thus far described, the pumping plungers have all been actuated directly by cams on the pump drive shaft. FIG. 9 shows another embodiment which employs a rocker arm actuation and hence, can achieve greater strokes for a given cam lift or strokes which can be varied if desired.

A pump constructed in accordance with this embodiment is identified generally by the reference numeral 301 and is shown only in a single cross-sectional view, because it is believed readily apparent to those skilled in the art, from the foregoing description, how the invention may be employed with varying numbers of plungers and varying orientations for them, such as in-line, V-type, etc., as previously described.

In this embodiment, the pump 301 includes an outer housing assembly 342 which defines a cavity 303 in which the pump drive shaft 304 is journaled for rotation in a manner as previously described. The pump drive shaft 304 has one or more cam lobes 305 that engage the follower portion 305 of a rocker arm, indicated generally by the reference numeral 307. The rocker arm or rocker arms, if more than one are employed, are rotatably journaled on a rocker arm shaft 308 that extends parallel to the axis of rotation of the pump drive shaft 304. As with all of the previously described embodiments, this pump drive shaft 304 rotates about an axis that is parallel to the axis of rotation of the crankshaft 27 and which, accordingly, is vertically disposed.

The rocker arm 307 has a further arm portion 309 that carries an adjustable follower 311 having a spherical portion 312 that is engaged with a yoke portion 313 of the pumping plunger, indicated generally by the reference numeral 314. The pumping plunger 314 has a shank or plunger portion 315 which is supported in a pump support element 316 which is affixed in the housing 302 and which has an O-ring seal 317 that provides a seal therewith.

A valve body and distribution member 318 is affixed to the main pump housing 302 with an O-ring seal 319 encircling the plunger supporting member 316 and providing a seal therebetween. A pumping chamber 3211 formed in the member 318 and receives the pumping end of the pumping plunger 315. A return spring 320 acts between the plunger support member 316 and the yoke portion 313 of the pumping plunger 315 to urge it into engagement with the adjustable follower 312 and to return it on its intake stroke.

Fuel is delivered to the pumping chamber 321 through an inlet fitting 322 which communicates with a delivery port 323. The low pressure regulator 324 communicates with this area and, as aforenoted, regulates the pressure from the low pressure pump by returning fluid to the fuel tank 48 through the return conduit 66.

A delivery check valve 325 permits fuel to flow into the pumping chamber 321 when the pumping plunger 311 is moving downwardly and precludes reverse flow as it moves upwardly. Upon upward movement, the fuel is compressed and discharged through a delivery check valve 326 to the accumulator chamber 58 through a supply passage 327 and a supply fitting 328.

Like the previously described embodiments, the mechanism is also lubricated by a lubricant pump that is driven off the lower end of the pump drive shaft 304 in a manner as previously described. The lubrication system for the pumping plunger 315 appears in this figure and it includes the outer supply game 329 that communicates with an inner lubricating groove 331 through a plurality of drilled passages 332, as with the previously described embodiments.

Figure 10:
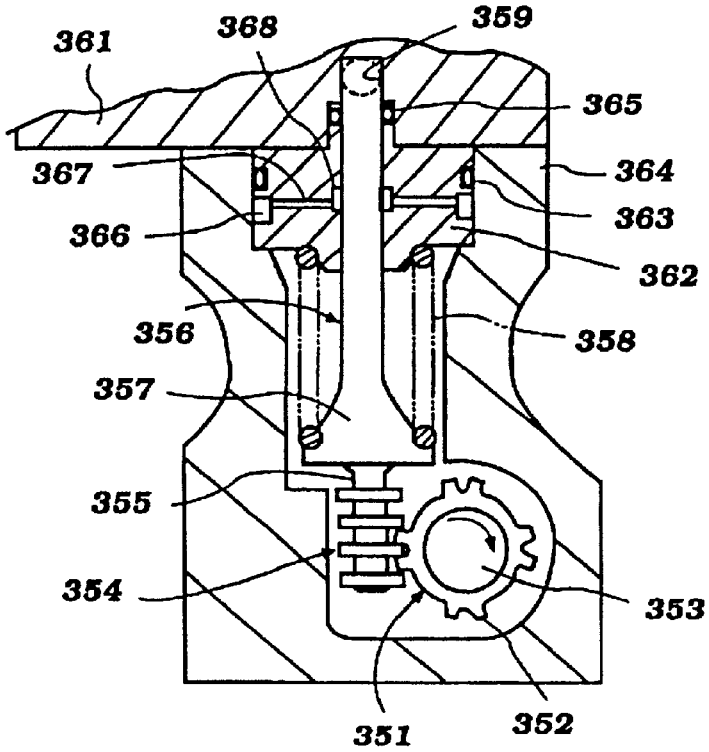
FIG. 10 is a cross-sectional view, in part similar to FIGS. 4, 6 and 9, and shows yet another embodiment of the invention.

FIG. 10 shows another type of pump plunger actuating mechanism, and since this type of mechanism may be employed with any of the pump assemblies as previously described, only the plunger actuating mechanism will be described. Unlike the previously described cam and follower mechanisms, this mechanism employs a Geneva or segmented gear-type drive, indicated generally by the reference numeral 351. A segmented gear having teeth segments 352 is affixed for rotation with the pump driving shaft 353. The teeth 352 are adapted to selectively engage follower ribs 354 formed on an extension 355 of the pump plunger, indicated generally by the reference numeral 356 to drive the plunger 356 sequentially. The pump plunger 356 has a shoulder portion 357 that is engaged by a spring 358 for urging the plunger to a retracted position in the pumping bore 359 formed by a cylinder head member 361.

The opposite end of the spring 358 acts against a plunger retainer element 362 which, like the previously described embodiments, provides an arrangement for lubricating the pump plunger 356. This member 362 has an O-ring seat 363 that engages the pump housing 364 for sealing therewith. A similar seal 365 is disposed between the end of the plunger supporting member 362 and the cylinder head 361.

An oil supply game 366 receives oil from an oil pump driven off the lower end of the pump drive shaft 353. This oil is then delivered to lubricate the plunger 356 through drilled passageways 367 and a lubricant supply groove 368 that extends around the pump plunger within the member 362.

Figure 11:
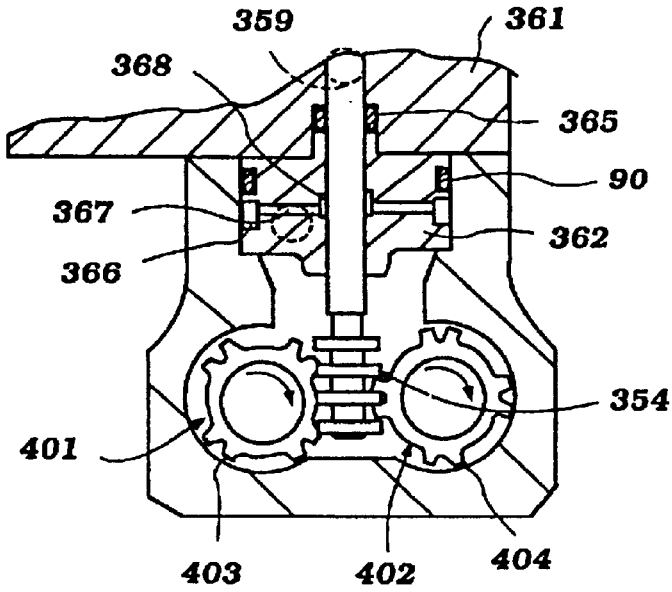
FIG. 11 is a partial cross-sectional view, in part similar to FIGS. 4, 6, 9 and 10, and shows still another embodiment of the invention.

FIG. 11 shows another embodiment driven similar to the embodiment of FIG. 10. In this embodiment, however, there are two Geneva gear mechanisms 401 and 402 that operate so that their teeth 403 and 404 are respectively out of phase with the ribbed members 354 on the pumping plunger. These Geneva gear mechanisms 401 and 402 are driven by a pump drive shaft (not shown) and rotate in the same direction and at the same speed, but at a different phase to each other as noted. Thus, this mechanism is capable of supplying more pumping strokes during a given cycle.

From the foregoing description, it should be readily apparent that the embodiments of the invention are extremely effective in providing a high pressure pump for a vertical engine that can have a compact construction and thus, may be conveniently placed-relative to the engine. In addition, the pump shaft rotates about a vertically extending axis to simplify the drive from the vertically extending output shaft to the engine. Lubricating systems are incorporated within the pump mechanism for its lubrication.

It should be readily apparent to those skilled in the art that the foregoing descriptions at don of preferred embodiments of the invention, and that various changes and modifications may be made without departing from the spirit and scope of the invention, as defined by the appended claims.

What is claimed is:

1. A fuel injected internal combustion engine having an output shaft rotatable about a vertically extending output shaft axis and driven by the combustion within the engine, a high pressure piston pump driven by a rotatable pump driving shaft journaled for rotation about a vertically extending pump drive axis and extending parallel to said engine output shaft axis, pump drive means for driving said pump drive shaft from said engine output shaft, and a lubricant pump driven off one end of said pump drive shaft for pumping lubricant to the elements of said high pressure pump.

2. The fuel injected internal combustion engine of claim 1, wherein the engine is a reciprocating engine and the engine output shaft comprises a crankshaft.

3. The fuel injected internal combustion engine of claim 1, wherein the lubricant pump is driven off the lower end of the pump drive shaft.

4. The fuel injected internal combustion engine of claim 1, wherein the pump drive shaft drives at least two pumping plungers.

5. The fuel injected internal combustion engine of claim 4, wherein the pumping plungers are disposed at an angle to each other, but in the same vertical plane.

6. The fuel injected internal combustion engine of claim 5, wherein the pumping plungers are opposed to each other.

7. The fuel injected internal combustion engine of claim 4, wherein the pumping plungers are arrayed in a vertical plane.

8. The fuel injected internal combustion engine of claim 7, wherein each pumping plunger is driven by a separate cam lobe.

9. The fuel injected internal combustion engine of claim 3, wherein the pump drive shaft is supported by a pair of spaced apart bearings and wherein the lubricant pump delivers lubricant to the bearings.

10. The fuel injected internal combustion engine of claim 9, wherein the lubricant pump further delivers lubricant to the pumping plunger for the lubrication of the pumping plunger.

11. The fuel injected internal combustion engine of claim 10, wherein the lubricant from the pumping plunger and the bearings is returned by gravity to the lubricant pump.

12. The fuel injected internal combustion engine of claim 2, wherein the lubricant pump is driven from the engine output shaft by a flexible transmitter.

13. The fuel injected internal combustion engine of claim 12, wherein the flexible transmitter comprises a chain.

14. The fuel injected internal combustion engine of claim 1, wherein the engine comprises the power plant of a marine outboard drive.

15. The fuel injected internal combustion engine of claim 14, wherein the engine is a reciprocating engine and the engine output shaft comprises a crankshaft.

16. The fuel injected internal combustion engine of claim 14, wherein the lubricant pump is driven off the lower end of the pump drive shaft.

17. The fuel injected internal combustion engine of claim 14, wherein the pump drive shaft drives at least two pumping plungers.

18. The fuel injected internal combustion engine of claim 17, wherein the pumping plungers are disposed at an angle to each other, but in die same vertical plane.

19. The fuel injected internal combustion engine of claim 18, wherein the pumping plungers are opposed to each other.

20. The fuel injected internal combustion engine of claim 17, wherein the pumping plungers are arrayed in a vertical plane.

21. The fuel injected internal combustion engine of claim 20, wherein each pumping plunger is driven by a separate cam lobe.

22. The fuel injected internal combustion engine of claim 16, wherein the pump drive shaft is supported by a pair of spaced apart bearings and wherein the lubricant pump delivers lubricant to the bearings.

23. The fuel injected internal combustion engine of claim 22, wherein the lubricant pump further delivers lubricant to the pumping plunger for the lubrication of the pumping plunger.

24. The fuel injected internal combustion engine of claim 23, wherein the lubricant from the pumping plunger and the bearings is returned by gravity to the lubricant pump.

25. The fuel injected internal combustion engine of claim 15, wherein the lubricant pump is driven from the engine output shaft by a flexible transmitter.

26. The fuel injected internal combustion engine of claim 25, wherein the flexible transmitter comprises a chain.

27. The fuel injected internal combustion engine of claim 14, wherein the engine comprises a reciprocating engine and the engine output shaft comprises a crankshaft driven by a pair of pistons slidably supported in a cylinder block having opposed cylinder banks, each defining at least one bore receiving respective one of said pistons.

28. The fuel injected internal combustion engine of claim 27, wherein the high pressure pump is disposed in a valley between the cylinder banks.

29. The fuel injected internal combustion engine of claim 28, wherein the high pressure pump has at least two plungers driven by the pump driving shaft and which are disposed in opposed relationship to each other.

30. The fuel injected internal combustion engine of claim 27, wherein the high pressure pump is disposed adjacent one side of one of the cylinder banks of the engine.

31. The fuel injected internal combustion engine of claim 30, wherein the pump has a plurality of pumping plungers disposed in a vertically arranged plane and which lie at a complementary angle to the angle of the cylinder bank.

32. The fuel injected internal combustion engine of claim 27, wherein the high pressure pump has a pair of pumping plungers disposed at a V angle to each other and is disposed on one side of one of the cylinder banks.

33. The fuel injected internal combustion engine of claim 32, wherein one of the pumping plungers reciprocates along an axis that is generally parallel to the axis of the cylinder bore of the adjacent cylinder bank and the other of the pumping plungers reciprocates along an axis that is generally perpendicular to the axis of the first pumping plunger.

*34. An outboard motor comprised of a power head consisting of an internal combustion engine and a surrounding protective cowling and a driveshaft housing and lower unit containing a propulsion device within said lower unit depending from said power head, said engine being mounted within said protective cowling so that its crankshaft rotates about a vertically-extending axis, said crankshaft being coupled to a drive shaft that depends into said driveshaft housing and lower unit for driving said propulsion device, said engine being formed with a plurality of combustion chambers, a plurality of fuel injectors for injecting fuel directly into respective of said combustion chambers, a high pressure fuel pump contained within said protective cowling and having a pumping element reciprocating along a horizontal axis for pressurizing fuel for delivery to said fuel injectors, and a mechanical transmission for driving said pumping element from said crankshaft for delivering, high pressure fuel to said fuel injector.*

*35. An outboard motor as set forth in claim 34 wherein the pumping element is operated by a rotating cam.*

*36. An outboard motor as set forth in claim 35 wherein the rotating cam rotates about a vertically extending axis that is parallel to the axis of rotation of the crankshaft.*

*37. An outboard motor as set forth in claim 36 wherein the rotating cam is positioned externally of the engine body.*

*38. An outboard motor as set forth in claim 37 wherein the rotating cam is fixed for rotation with a camshaft that is directly driven by the crankshaft through a flexible transmitter.*

*39. An outboard motor as set forth in claim 34 wherein the engine is a spark ignited engine.*

*40. An outboard motor as set forth in claim 39 wherein the fuel injectors, inject fuel directly into the combustion chambers.*

* * * * *